US010463973B2

(12) United States Patent
Miller (10) Patent No.: US 10,463,973 B2
(45) Date of Patent: *Nov. 5, 2019

(54) SYSTEM AND METHOD FOR ARRANGING EQUINE COMPETITIONS ACCORDING TO PARTICIPANT ABILITY GROUPINGS

(71) Applicant: Equibrand Corporation, Granbury, TX (US)

(72) Inventor: Rodney E. Miller, Stephenville, TX (US)

(73) Assignee: Equibrand Corporation, Grandbury, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,191

(22) Filed: Jan. 30, 2018

(65) Prior Publication Data

US 2018/0280808 A1 Oct. 4, 2018

Related U.S. Application Data

(63) Continuation of application No. 15/473,416, filed on Mar. 29, 2017, now Pat. No. 9,895,615.

(60) Provisional application No. 62/390,422, filed on Mar. 29, 2016.

(51) Int. Cl.
*A63F 13/21* (2014.01)
*A63F 13/798* (2014.01)
*A63F 13/803* (2014.01)
*G06F 7/02* (2006.01)

(52) U.S. Cl.
CPC .......... *A63F 13/798* (2014.09); *A63F 13/803* (2014.09); *G06F 7/026* (2013.01)

(58) Field of Classification Search
CPC .................................................. A63F 3/00082
See application file for complete search history.

(56) References Cited

U.S. PATENT DOCUMENTS

| | | | |
|---|---|---|---|
| 4,031,376 A | 6/1977 | Corkin, Jr. | |
| 5,513,103 A * | 4/1996 | Charlson | G07F 17/32 348/157 |
| 5,573,244 A | 11/1996 | Mindes | |
| 5,842,921 A | 12/1998 | Mindes et al. | |
| 5,893,069 A | 4/1999 | White, Jr. | |
| 7,645,191 B1 * | 1/2010 | McKeever | G07F 17/3288 273/246 |
| 8,007,354 B2 | 8/2011 | Mindes | |
| 8,532,798 B2 | 9/2013 | Ferraro, III et al. | |
| 8,690,657 B2 | 4/2014 | D'Angelo | |
| 2004/0104845 A1 | 6/2004 | McCarthy | |
| 2004/0229675 A1 | 11/2004 | Cannella | |
| 2012/0123571 A1 * | 5/2012 | Lange | G06Q 40/04 700/93 |

OTHER PUBLICATIONS http://morganboston.weebly.com/barrel-racing.html.
https://en.wikipedia.org/wiki/Barrel_racing.

* cited by examiner

*Primary Examiner* — Omkar A Deodhar
(74) *Attorney, Agent, or Firm* — Braxton Perrone, PLLC (57) ABSTRACT

A timed equine race grouping system and method for organizing competitive events, such as a timed barrel race, by using prior performance data in prior similar events to determine the appropriate ability of each contestant and then forming ability groups such that the contestants are competing against other contestants having similar abilities.

21 Claims, 6 Drawing Sheets

SYSTEM AND METHOD FOR ARRANGING EQUINE COMPETITIONS ACCORDING TO PARTICIPANT ABILITY GROUPINGS

CLAIM OF PRIORITY

This application claims priority to co-pending application Ser. No. 15/473,416 filed Mar. 29, 2017 and the benefit of Provisional Patent Application No. 62/390,422 filed Mar. 29, 2016, which are incorporated by reference herein in their entireties.

BACKGROUND OF THE INVENTION

Technical Field

The present invention relates to systems and methods establishing and arranging ability groupings for participants in certain equine competitions based on a Past Performance Indicator (PPI). Ability groupings are established in equine events in order for contestants, including their equine, e.g. horse, to compete against others of the same or similar capability. Horse/rider contestants are assigned to an ability group based on their PPI, which is calculated based on results from their prior events. The systems and methods disclosed herein can be used for equine speed events as well as judged events. A preferred embodiment of the presently described system and method is an equine sporting event that is a speed event called barrel racing.

Description of Related Art

The event of barrel racing draws many contestants. In a barrel race each contestant rides a horse around a predefined path of three spaced barrels in a triangle pattern, such as that shown in FIG. 1. The goal of the horse and rider in such a race is to complete the course in the shortest amount of time possible. The time it takes from when the horse interrupts a photoelectric light beam until it finishes the pattern and again interrupts the same light beam racing out of the arena is their run time. One of the ways that barrel races are conducted is that each contestant competes against every other contestant and the fastest finishers win a prize, typically in the form of cash. Depending upon the size of the field of competitors, the producers of the event may award cash prizes to only the one horse and rider pair with the fastest time or some plurality of top finishers.

Another method that allows for more contestants, separates the run times of all horse/riders after they have competed in the race into 4 or 5 groups or splits of run times called divisions. The contestants having the fastest run times in each of these splits wins their division. While this pits contestants, including their horses, against only those with similar run times, it does so after the barrel race has been completed. It would be far more fair, interesting and sporting if each contestant (i.e., rider) and/or equine competed with others having similar capabilities and records based on results of previous events. That is, the division and assignment of events pitting competitors of similar abilities against each other occurs before the start of race, rather than aligning contestants after races begin.

Other types of equine sporting competitions are judged to determine how well contestants and/or horses perform during an event. Most of the judging competitions today are divided using classes of competitors including classes for junior, novice, amateur, senior, non-professional, professional and others. There is a need, therefore, for systems and methods to appropriately categorize, assign and group competitors in both timed and judged equine events according to the contestants' respective ability levels.

BRIEF DESCRIPTION OF THE DRAWINGS

FIG. 3 is a chart depicting places paid factors according to an embodiment of the present invention.

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

The presently described equine competition event grouping system and method rely on ability comparisons of competitors based on past competitor performance in order to create groupings or sets of competitors of substantially equal abilities. The presently described ability groupings are determined based on a Past Performance Indicator (PPI), which is used to determine a competitor's event-related ability based on prior performance data. Barrel Racing Ability Grouping Sport (BRAGS™) is a novel competitive format used at barrel racing events to promote and facilitate barrel racing among competitors of similar racing ability. To be placed in an ability group prior to an event, contestants (equine and rider) competing in an equine event, such as a BRAGS™ event must have a PPI. Because the horse's speed results in prior events are a good determinate of its athletic ability, the preferred PPI for speed events is the horse's run speed (feet/second) from prior events. This speed, or Run Rate™ reflects its average speed maintained during a plurality of prior barrel races or runs. Once all contestants are entered, their converted Run Rate™ or Run Speed Index™ (RSI) is used to formulate ability groups of substantially equally matched horses and riders. Thus, each contestant will be competing against only the contestants with similar ability. Before a race begins, the competitors will know whom they will be competing against, and prizes and/or prize money will be awarded in each ability group according to the fastest time, second fastest time, etc. The prize payouts, in one embodiment money prizes are calculated to allow all contestants to have the same odds of winning. The present method and system of leveling the odds or probability that contestants of different ability levels can win a barrel race encourage more racers to enter and compete and at the same time draws more interest among spectators.

This format relies on contestants' PPIs to establish ability grouping thus allowing all levels of equine event contestants to compete with others in equally matched groups based on prior performance data. Although barrel racing is the preferred described sport, the Barrel Racing Ability Grouping Sport (BRAGS™) method can also be used for other well-known speed events including, but not limited to, pole bending, flag racing, and straight barrels. Similarly, ability grouping can be used at judged equine events including cutting, reining, reining cow horse and hunter jumper in order to subdivide classes into smaller groups based on prior event scores. Contestant/horse entries must have PPI to group contestants within their event classes. For judged equine events, the preferred PPI will be the average of judged scores from prior events. In another embodiment the PPI may be a function of additional data. Classes, therefore, can be subdivided based on the ability of horse/rider combination. By utilizing past judging scores to determine a PPI for each contestant and then ability grouping the contestants and/or equine, some of these classes can be eliminated and/or combined by allowing riders to be grouped together based on judging scores from prior events.

According to one embodiment, if a contestant and/or equine does not have any, or enough, prior performance results to determine a PPI, that competitor will nevertheless be allowed to compete under review. In such an instance, the competitor's current event speed or judged score is used to assign the competitor to an ability group. Along with the performances of the others in that ability group, winner(s) are determined.

In operation, the presently described equine ability grouping systems and methods are employed to organize and enhance barrel racing contests in rodeos, jackpots and other events. In order for contestants and/or equine competing in a BRAGS™ event to be placed in an ability group prior to the event, their respective ability levels must be determined based on prior performance data. Prior performance data is used to determine each contestant's PPI, which is used to draw contestants into ability groups. A horse's speed results in prior events is a primary indictor of its athletic ability and is, therefore, the preferred variable used to determine the PPI. The horse's run speed from prior events will be referred to as Run Rate™ or Run Speed Index™ (RSI). In other embodiments, however, PPI can be based on one or more other data points, including, but not limited to, the contestant's riding ability, run consistency, split rates, age, prior winnings, entry-to-win ratio, return on investment, classification, and the like.

Figure 1:
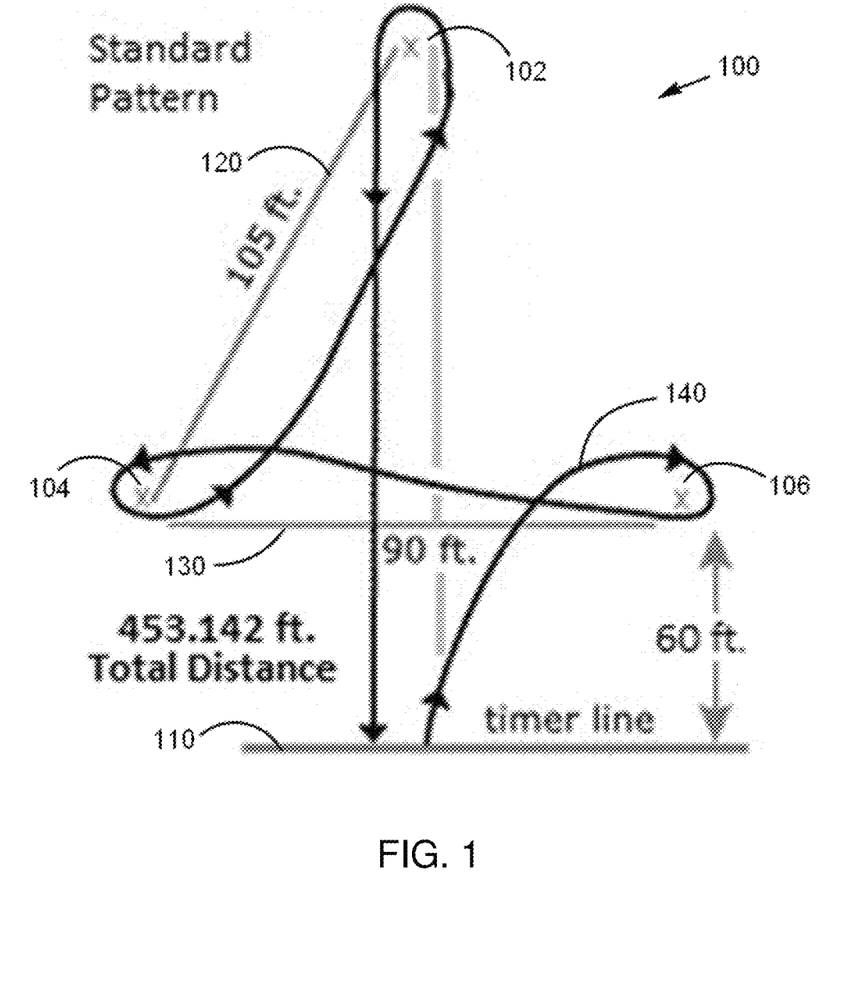
FIG. 1 is a depiction of a rodeo barrel race course according to an embodiment of the present invention.

In one embodiment, a contestant's/horse's Run Rate™ or RSI™ is calculated according to the following process. First, the horse's running speeds or event rates (ERs) from prior races are calculated for a number x of previously entered events, rodeos, etc. To calculate the ER for a single event the pattern distance (PD), which is the total number of feet a horse travels during a race, and the run time (T) in seconds spent to complete the pattern are determined. In a barrel race, competitors race in a clover leaf pattern around situated barrels. FIG. 1 depicts a typical barrel race course 100. An embodiment of race course 100 includes three barrels or other objects that a rider and horse pair must navigate during the race. These barrels are arranged in a triangular pattern so as the pairs travel the course, they form a clover-type pattern.

As shown in FIG. 1, a first barrel, a second barrel and a third barrel are arranged at points 106, 104 and 102, respectively, in an isosceles triangular pattern. Each horse and rider pair starts the timed event at timer line 110. Timer line 110 can be equipped with a light beam activated timer as is known in the art in which the timing of a pair's run starts when the sensor associated with the light beam is interrupted and stops when the pair crosses the time line again and disrupts the light beam again. As shown, the horse rider pair travel a path 140 around each of the three barrels at locations 106, 104 and 102. In a standard barrel race course, first barrel 106 is situated a distance 130 from second barrel 104. Second barrel 104 in turn is placed a distance 120 from third barrel 102. In a standard course 100, distance 120 is approximately 105 feet and distance 130 is approximately 90 feet. The PD for a standard barrel pattern 100 as shown is 453.142 feet when a rider and horse pair follows path 140. The more efficiently or tightly the pair can navigate barrels 106, 104 and 102, the shorter the actual path of travel, which translates into a faster course completion time.

Because some rodeo venues or arenas cannot accommodate a standard pattern as shown in FIG. 1, barrel patterns will have varying pattern distances depending on the arena size. Therefore, all ERs are standardized or adjusted along a standardized slope (SS) to a Common Pattern Distance (CPD). In one embodiment, the preferred SS is 0.02152 as determined by performing a linear regression of prior PDs and corresponding run times in a linear regression calculation. This SS factor, however, may increase or decrease as additional data becomes available and a more accurate slope is calculated. The SS is determined by graphing results from hundreds of run times and their corresponding PDs (not only from an individual horse/rider pair). Using this large number of data points enables determination using linear regression of a standardized slope, that is, a standardized relationship between a run time and a PD.

Once the SS is determined, a contestant's ER for each previous race is determined based on the formula:

$$ER = CPD \div [((CPD-PD)*SS) + T]$$

In the above formula and throughout this disclosure, an asterisk ("*") denotes the multiplication operation. The above formula is used for all ER calculations in order for each ER calculation to be standardized according to a common pattern distance CPD. Note that the PD is calculated for each different arena because the actual pattern measurement for each arena will vary. Also, CPD is preferably 400 feet, but can be increased or decreased. Run time, T, used in the calculation preferably does not include any penalty seconds added to a contestant's result from a prior event, as such penalty seconds tend to not be indicative of ability.

Once all ERs are calculated from an event in the manner described above, the ERs are analyzed to determine whether the results may be skewed or anomalous due to factors affecting a particular event beyond the contestant's control, such as poor arena ground conditions, an overly difficult arena set up or other extraordinary conditions. If the results from a barrel race or rodeo are determined to be anomalous, that event will not be used for determining Run Rates™. The process to determine if ERs are skewed or anomalous due to adverse or extraordinary conditions includes a comparison of the speed of horse/rider pairs at the event in question with the run rate upon entering the current event. This comparison is referred to as the Run Gauge (RG). Run Gauge is indicative of a horse/rider's success at an event. If the average Run Gauge from all contestants is low it indicates an outside factor or condition that led to the out of the ordinary result. This process of determining Run Gauge is described below.

For each horse/rider pair that is competing in an event, a list of RGs is created. For each horse/rider pair, the RG is the ER less the pair's current Run Rate™, or RG=ER−RR. Then, for each pair if the RG value for a particular race is greater than or equal to −3.0 feet per second (RG>=−3.0 ft./sec.), the event is included in the RG calculation. If RG<=−3.0 ft./sec., then that race result is excluded from the RG calculation. Any RG values discarded at this step are not used in the Run Rate calculation for a horse/rider pair.

Once any low RG values are excluded, an average of the remaining RG values is calculated. If the average RG value is greater than negative 1.0 (A>=−1.0), then there is no evidence that the race has skewed results and all Event Rates from the event can be used in RR calculations. If, however, A<−1.0, that is, on average event times were much slower than the horse/riders capability, all ERs from that event will be discarded and not used in Run Rate calculations. Although −1.0 is the preferred value used to determine if particular race results will be discarded, this value can be increased or decreased as more data is collected.

Next, the horse/rider pair's RR will be calculated from their prior ERs. This calculation is performed according to the following steps, with X being the number of ERs for the horse and rider pair. The preferable minimum value for X is at least five (5). If X is less than five, the pair's RR will not be calculated. However, the minimum number of ERs (5) used in calculating a pair's RR may increase or decrease.

If X>=5, then ERs are sorted according to competition date in descending order and only the top N ERs are used, such that 5<=N<=20. For each remaining ER, those that had a Run Gauge (RG) greater than one foot per second (RG>1.0) are counted twice in the following step (added as an additional ER). These ERs are doubled or counted twice because they are considered "exaggerated event rates" that are substantially faster than the pair's current RR.

RR is calculated by taking the better half average, that is calculating the average of each pair's top N÷2 (integer division) ERs. For example, if a horse/rider pair has five ERs of 25.2, 25.0, 24.8, 24.6 and 24.4, only the top 5÷2=2 ERs will be used to calculate the Run Rate™ RR. Thus, the calculation will be:

$$RR=(25.2+25.0)\div 2=25.1$$

Finally, the pair's RR is converted to a Run Speed Index or RSI™ for easy understanding. Various scales can be used for RSI™ calculations. The preferred 10 point scale for converting RR to RSI value is determined by RSI=10−(26−RR). However, other scales can be used such as a 100 point scale, determined by RSI=100−((26−RR)/0.1).

Note that when a horse/rider pair wishes to enter a BRAGS™ event before accumulating sufficient ERs, (preferably 5) to calculate an RR, the pair can be allowed to run "under review". This means that the pair will be allowed to compete, but will not be drawn into an ability group prior to the event. After the event, however, the pair will be "post-grouped" into an ability group using their ER to determine their "G" (ability group, G, see below). This specific ER will be recorded and used along with their prior Event Rates in the RR calculation for their next event.

Ability Groupings

Figure 2:
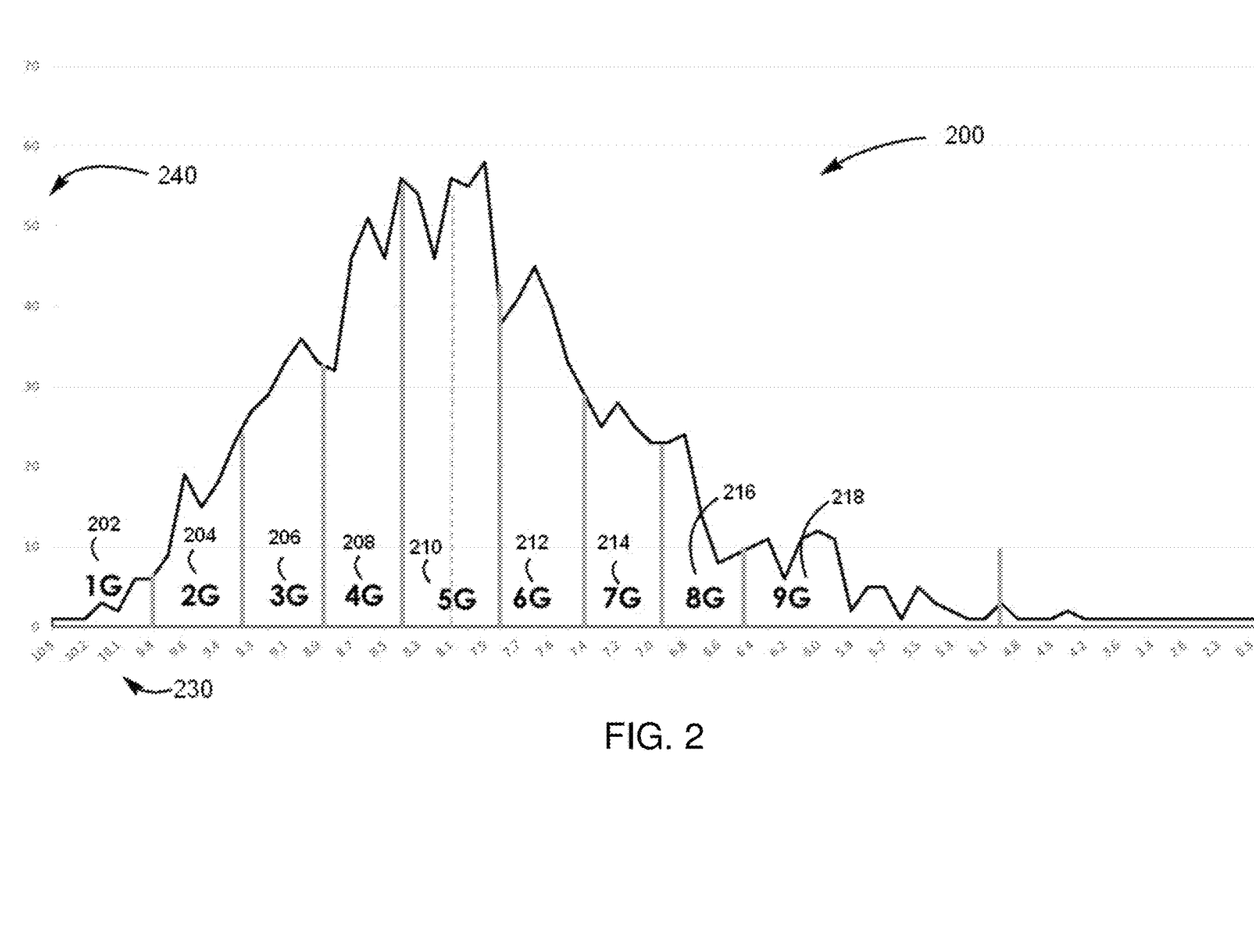
FIG. 2 is a chart of an ability grouping in an equine event according to an embodiment of the present invention.

Once all barrel racers are entered at a BRAGS™ event, contestants with current RSIs™ calculated as described above will then be drawn or placed, into substantially equally matched ability groups. These ability groups, or Gs, will be formed using statistical analysis of the RSIs for all entered horse/rider contestants. One embodiment for grouping the rider/horse pairs is depicted in the ability groupings plot 200 of FIG. 2. As seen in FIG. 2, the ability grouping process starts by determining the mean RSI then moving outward. The ability groups shown in FIG. 2 are designated group 1G 202, 2G 204, 3G 206, 4G 208, 5G 210, 6G 212, 7G 214, 8G 216 and 9G 218. The x-axis or horizontal axis 230 of ability groupings plot 200 represents the beginning and ending range of each ability group's RSI value and the y-axis or vertical axis 240 represents the number of entrants in each ability group. The fastest ability group is 1G 202, the next fastest is 2G 204 and so on. The number of ability groups will vary depending on the overall range of RSIs entered at the event. In the ability grouping plot in FIG. 2 for a barrel race, there are nine groupings (Gs) of contestants. A preferred range of each ability group or Group Range (GR) is calculated based on the standard deviation (SD) according to the following rules.

If SD>=1.0 then GR=0.5
If 0.6<=SD<=0.9 then GR=SD/2 (integer division)
If SD<=5.0 then GR=0.2

GR may also be estimated at a value of 0.5 or can be reduced (narrowed) or increased (widened) by the barrel racing producer depending on the number of ability groups desired. A preferred minimum number of contestants drawn into an ability group or minimum group count (MGC) can be determined based on the following rules:

For 50 or fewer entries, MGC=3
For 51 through 120 entries, MGC=5
For more than 120 entries, MGC=4% of the number of entries The minimum group count (MGC) can also be adjusted upward or downward by the barrel racing producer. As seen in FIG. 2, for the ability groups formed at a typical barrel racing event each contestant only competes against barrel racers in the ability group in which they are drawn into. That is horse rider pairs within 1G 202 compete against only those pairs within 1G 202. Horse rider pairs within 2G 204 only compete against only those pairs within 2G 204 and so on. The fastest race time in each group will be declared the winner of the ability group. The next fastest time will be second and so on. In this manner, racers of every ability level are incentivized to compete. No horse and rider pair will be assigned to more than one ability group.

Figure 4:
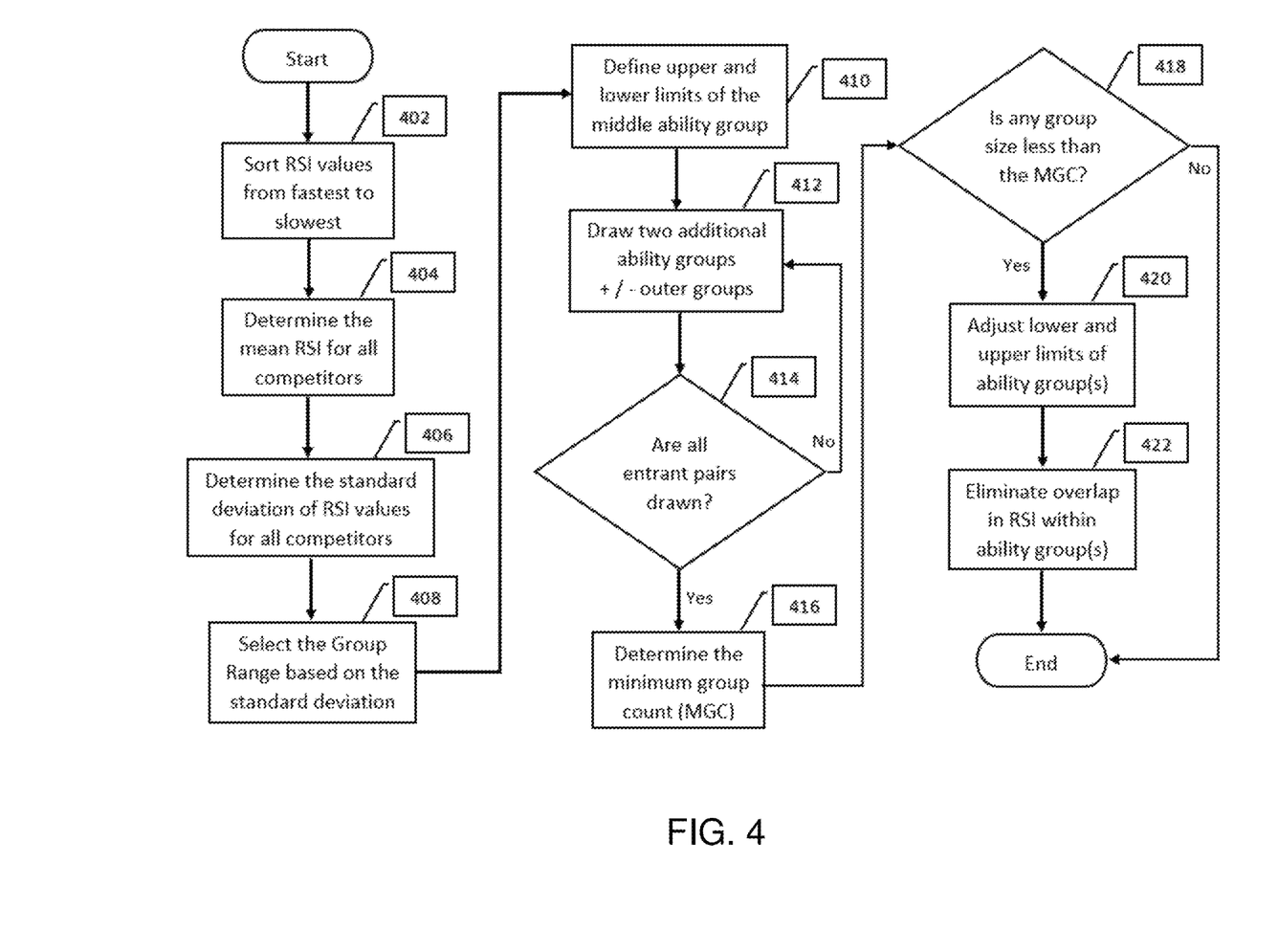
FIG. 4 is a flow diagram of a method according to an embodiment of the present invention.

A method performed according to an embodiment of the presently described system of establishing the ability groups at a BRAGS™ event is shown in the flow diagram of FIG. 4. The method of FIG. 4 begins at step 402 where the RSI™ values corresponding to a group of race entrants are sorted from fastest RSI time to the slowest RSI time. Next, at step 404, the mean RSI value is determined for all competitors entered in the event. Then at step 406 the process continues with a determination of the standard deviation of the RSI values for all of the competitors entered in the event. Step 406 can be completed according to a well-known manner of standard deviation calculation.

At step 408 the process continues with selection of a Group Range (GR) according one of the rules described below. In one embodiment, if SD>=1.0, then GR=0.5, but if 0.6<=SD<=0.9, then GR=SD/2 (integer division). If SD<=5.0 then GR=0.2. Next, at step 410 the upper and lower limits of the middle ability group among the groups are defined. In this step, one half of the Group Range (0.5*GR) is added and subtracted from the calculated mean RSI™ from step 404. These values then serve as the upper and lower limits of the middle ability group, e.g. 5G 210 in the chart of FIG. 2. At step 412, two additional ability groups are drawn by adding and subtracting the Group Range to the upper and lower ability group limits of the upper and lower limits of the middle ability group defined in step 410. In this step, second and third ability groups 4G 208 and 6G 212 as shown in FIG. 2 are defined.

The process continues at step 414 where the system queries whether all race pairs have been included in an ability group. If the answer to this query is "no", the process repeats step 412, but next defined ability groups are based on the upper and lower limits of the last defined ability group(s). As seen in FIG. 2, groups 3G 206 and 7G 214 would be the next groups defined. If, on the other hand, the answer to query 414 is "yes", the method moves to step 416 to determine the minimum group count (MGC). In a preferred embodiment, the minimum group count (MGC) is determined, where for 50 or fewer entries, MGC=3; for 51 through 120 entries, MGC=5; and for more than 120 entries, MGC=4% of the number of entries. Once the MGC is determined, the process continues with step 418 where the system queries whether at least one group is fewer in number than the MGC. If the answer to this query is "yes", the at step 420 the lower and upper RSI values of the ability groups are adjusted so that all group sizes are greater than or equal to the MGC. For each group having fewer entrants in number than the MGC, if the ability group is a lower numbered ability group (meaning a group having higher ability to left of the ability group containing the mean RSI), then the lower limit of the ability group at issue is decreased in one tenth (0.1) increments until (a) the MGC is reached and (b) the next contestant's RSI is not a duplicate. Next, the upper limit of the next G is adjusted at step 422 so no overlap occurs.

If, on the other hand, the ability group is higher numbered ability group than the mean ability group (meaning a group having lower ability to right of the ability group containing the mean RSI), then the upper limit of the ability group at issue is increased in one tenth (0.1) increments until (a) the MGC is reached and (b) the next contestant's RSI is not a duplicate. Then, the process concludes at step 422 with the lower limit of the previous G is adjusted to eliminate overlap of adjacent ability groups. Note that either of these steps within step 418 may cause an adjacent ability group to fall below the MGC. If this occurs, the steps above are repeated until all groups sizes are greater than or equal to the MGC.

Figure 5:
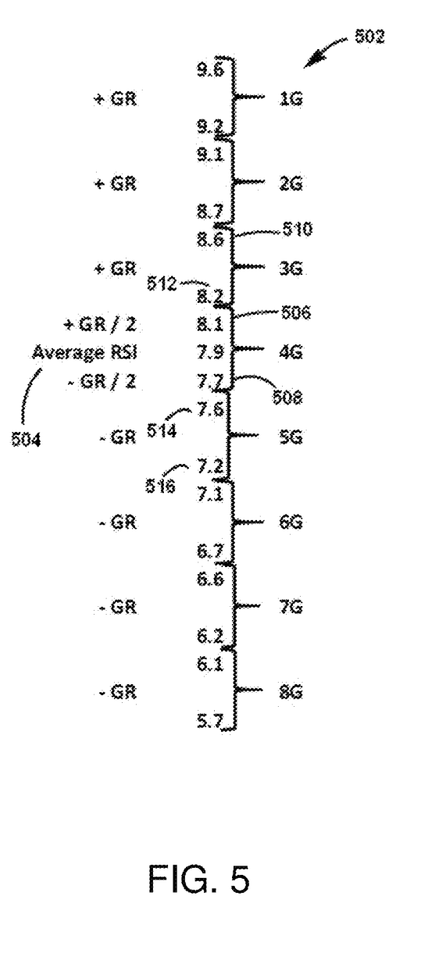
FIG. 5 illustrates a set of ability groupings and group range upper and lower limits according to an embodiment of the invention.
Figure 6:
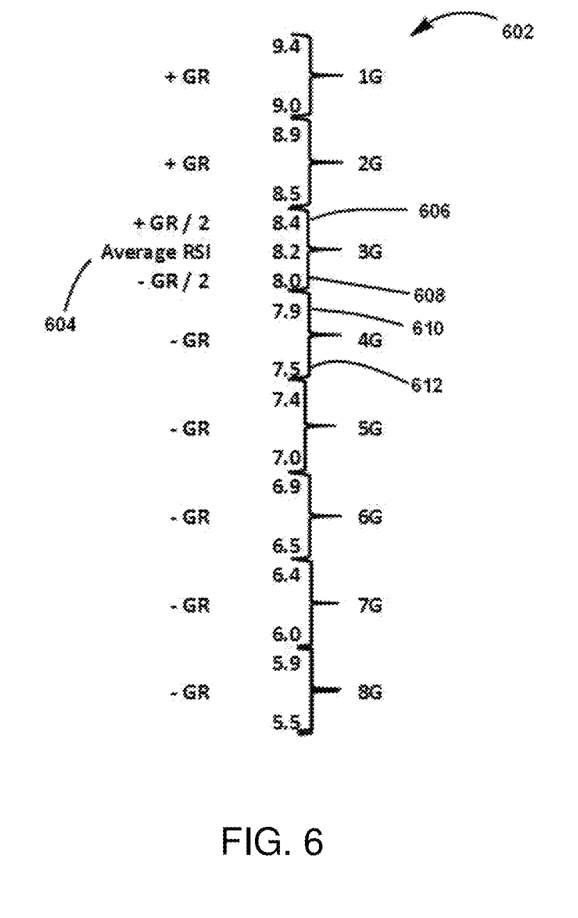
FIG. 6 illustrates a set of ability groupings and group range upper and lower limits according to an embodiment of the invention.

FIG. 5 depicts eight ability groupings 502. Each grouping 502 is centered around an average RSI value 504, and the group range GR is set based on the standard deviation of the RSI values. As shown, for group 4G, its RSI range includes the average RSI value 504, and upper limit 506 and lower limit 508. The next created ability groups 3G and 5G have their upper and lower limits established. Group 3G's upper limit 510 and lower limit 512 are shown as are upper limit 514 and lower limit 516 of group 5G. Similarly, in FIG. 6, eight ability groupings 602 are shown. In FIG. 6, however, each ability grouping 602 centers around an average RSI value 604 that resides in ability group 3G. Group 3G includes upper limit 606 and lower limit 608 and neighboring ability group 4G includes upper limit 601 and lower limit 612. The group range GR again is based on the standard deviation of the RSI values.

Following the process described in FIG. 4 group entrant payout is determined, as will be discussed below.

Determining Ability Group Payout. The number of places to be paid in each ability group or places per entry (PPE) is determined by the number of contestants in each ability group. By paying one place for every B barrel racers in the ability group, the odds of placing will be the same for all barrel racers entered no matter which ability group into which they are drawn. For example, if a producer chooses to pay one place for every ten barrel racers in each Group (PPE=10), the odds of winning will be 1:9 for each barrel racer. A "proportional" method will be used to determine the amount of prize money for each winning position using the following steps. First, the total amount of prize money (PM) to be awarded at the competition is determined. Next, the PPEs that will actually be paid out is selected. Then, for each ability group the number of places that will be paid (PP) is determined by dividing the group size by the PPE, where L is the largest number of places paid (PP). Next, for each ability group a "Matrix Percentage" (MP) is determined according to MP=PP/(Group Number*L). Thus, the lower the group number, the higher the percentage of the total prize money paid for that group as compared to higher numbered groups.

Then, for each ability group the group percentage (GP) is calculated according to the following formula:

$$GP=MP/S$$

where S is the sum of all the Matrix Percentages (MPs). Next, the total amount of prize money available for each ability group (G$) is determined according to $$G\$=GP*PM$$

Finally, for each specific ability group, the prize money available for each place within the ability group is determined based on the prize factor table 300 shown in FIG. 3. For each place within an ability group, G$ is multiplied by the factor in FIG. 3 that corresponds to a place of finish. Various places paid factor 310 represent the number of finishers in an ability group that will receive prize money. The total of each vertical column of places paid factors is 100, representing 100 percent of the prize money for that group. In prize factor table 300 includes values for an ability group having three entrants eligible to receive a prize. Note that in such a group, the places paid factors in the column bearing the heading "3" total 100. The places paid factor for the third finisher eligible to receive prize money in a group in which three entrants receive a prize is 16.69, found at location 320 of prize factor table 300. That is, the third place finisher in a group having three entrants eligible to receive a cash prize will receive 16.69 percent of the prize purse for that ability group. The places paid factors in FIG. 3 represent only one embodiment and the individual prize money available may be increased or decreased depending on the barrel race producer's preference.

The following examples demonstrate the ability groupings, modifications and payouts determined by employing the methods described above for a given barrel race, or other similar contest.

Example 1

The following is an example of the payout at a barrel racing event according to the aforementioned protocol. This example assumes that the barrel race producer will pay one place for every seven contestants (PPE=7) in each ability group and that the barrel race had 104 entries, with each contestant paying an entry fee of $35. The total amount paid out to the winners is 75% of the total entry fees collected.

Based on these assumptions, the total amount of prize money PM to be awarded at the competition is:

$$PM=104*\$35*0.75=\$2,730$$

With the selection of PPE=7, the number of places to be paid (PP) in each ability group is determined by dividing the group count by the PPE and rounding up to the nearest integer. Therefore, $$PP1=24/7=3.4=4$$

$$PP2=17/7=2.4=3$$

$$PP3=27/7=3.8=4$$

PP4=15/7=2.1=3

PP5=14/7=2.0=2

PP6=7/7=1.0=1

For each ability group, the Matrix Percentage (MP) is determined such that

MP=PP/(Group Number*$L$)

where L is the largest number of places paid for PP1 through PP6. In this example, as seen above, L (PP1)=4, so for PP1 through PP6, the MP is

MP1=4/(1*4)=1.0000

MP2=3/(2*4)=0.3750

MP3=4/(3*4)=0.3333

MP4=3/(4*4)=0.1875

MP5=2/(5*4)=0.1000

MP6=1/(6*4)=0.0417

Next, the sum S of all of the MPs is determined.

$S$=1+0.3750+0.3333+0.1875+0.1000+0.0417=2.0375

For each ability group, the Group Percentage (GP) is determined by

GP=MP/$S$ such that

GP1=1.0000/2.0375=49.08%

GP2=0.3750/2.0375=18.40%

GP3=0.3333/2.0375=16.36%

GP4=0.1875/2.0375=9.20%

GP5=0.1000/2.0375=4.91%

GP6=0.0417/2.0375=2.04%

With each GP known, the total amount of prize money (G$) to be paid out in each G is

G$=GP*PM where the resulting G$ for each group G, rounded down to the nearest dollar, is

G$1=49.08%*2,730=$1,340

G$2=18.40%*2,730=$502

G$3=16.36%*2,730=$447

G$4=9.20%*2,730=$251

G$5=4.91%*2,730=$134

G$6=2.04%*2,730=$56

Next, places paid factors, such as those shown in FIG. 3 for four entrants in an ability group are used to determine the prize money for each placing entrant (all amounts are rounded down to the nearest dollar). For the ability group 1G the prize money awarded is:

$1^{st}$ place—$1,339*40%=$535

$2^{nd}$ place—$1,339*30%=$401

$3^{rd}$ place—$1,339*20%=$267

$4^{th}$ place—$1,339*10%=$133

Table 1 below shows the payout for all of the six ability groups according the process described above.

TABLE 1

| Group | No. | Group | No. | Group | No. | Group | No. | Group | No. | Group | No. |
|---|---|---|---|---|---|---|---|---|---|---|---|
| 1G 49.08% | 24 1,340 | 2G 18.4% | 17 502 | 3G 16.36% | 27 447 | 4G 9.2% | 15 251 | 5G 4.91% | 14 134 | 6G 2.04% | 7 56 |
| Place | Amt. | Place | Amt. | Place | Amt. | Place | Amt. | Place | Amt. | Place | Amt. |
| 1 | 535 | 1 | 250 | 1 | 178 | 1 | 125 | 1 | 89 | 1 | 55 |
| 2 | 401 | 2 | 167 | 2 | 133 | 2 | 83 | 2 | 44 | | |
| 3 | 267 | 3 | 83 | 3 | 89 | 3 | 41 | | | | |
| 4 | 133 | | | 4 | 44 | | | | | | |

Example 2

In this example, 119 contestants entered at BRAGS™ barrel racing event. The average RSI™ for all entries is 7.9 and the standard deviation is 0.8. FIG. 5 depicts the upper and lower limits of each ability group that are calculated based on a Group Range (GR) equal to half of the standard deviation (GR=0.8*0.5=0.4)

Table 2 below reflects the starting/ending RSI™ values, number of contestants and Group Range for each ability group 1G through 8G based in accordance with the groupings shown in Table 1, above. Note that the 8G ability group is less than the preferred minimum group count (MGC) of five contestants.

TABLE 2

| Group | Start | End | Count | Range |
|---|---|---|---|---|
| 1G | 9.2 | 9.6 | 6 | 0.4 |
| 2G | 8.7 | 9.1 | 13 | 0.4 |
| 3G | 8.2 | 8.6 | 36 | 0.4 |
| 4G | 7.7 | 8.1 | 20 | 0.4 |
| 5G | 7.2 | 7.6 | 22 | 0.4 |
| 6G | 6.7 | 7.1 | 15 | 0.4 |
| 7G | 6.2 | 6.6 | 5 | 0.4 |
| 8G | 5.7 | 6.1 | 2 | 0.4 |

Because the number of contestants drawn into the 8G group is less than the preferred minimum group count, the ability group range(s) must be adjusted. Table 3 below shows the contestants drawn into the 6G and 7G ability groups based on these adjustments in accordance with the systems and methods of the present invention.

TABLE 3

| First | Last | Horse | RSI | Draw |
|---|---|---|---|---|
| DiJanne | Smith | Redman's Irish | 7.1 | 6 |
| Ann | Barrett | RD | 7.1 | 6 |
| Kelli | Garcia | Tyrees Playn Badger | 7.0 | 6 |
| Teresa | Busch | Dun Kickapoo Otta You | 7.0 | 6 |
| Lisa Jo | Velliquette | Namgis D 71 | 7.0 | 6 |
| Makynna | Baldwin | Glider | 6.9 | 6 |
| Karen | Walinder | Running For Patriot | 6.9 | 6 |
| Slim | Wiginton | Tommys Colonel | 6.9 | 6 |
| Janis | Bading | Mr. Hickory Grullo | 6.9 | 6 |
| Niki | Homer | Nck Smashn Jazzdance | 6.8 | 6 |
| Shanna | Marquart | Dazzling Magic Potion | 6.8 | 6 |
| Lori | Buschbacher | Smokin Guns N Roses | 6.8 | 6 |
| Rose | Bonham | A Firey Bet | 6.8 | 6 |
| Jan | Sigler | Pecos | 6.7 | 7 |
| Sherry | Assmann | Crazy Alice | 6.7 | 7 |
| Alicia | Darling | Effie | 6.7 | 7 |
| Joy | Baldwin | Molly | 6.7 | 7 |
| Leshia | Knox | A Firewater Honey | 6.7 | 7 |
| Jamie | Butler | Frosty Romance | 6.3 | 7 |
| Penny | Mitchell | Stormy | 6.3 | 7 |
| Janice | Stephens | Nickys Private Jet | 6.1 | 7 |
| Tracey | Nietsch | Boon Rush | 5.9 | 7 |

Table 4 below depicts the adjusted group ranges and counts that will be used in the barrel race. Note that the group range for the 7G group increased to meet the minimum group count of five while the group range for the 6G group decreased in order to remain below the original upper limit.

TABLE 4

| Group | Start | End | Count | Range |
|---|---|---|---|---|
| 1G | 9.2 | 9.6 | 6 | 0.4 |
| 2G | 8.7 | 9.1 | 13 | 0.4 |
| 3G | 8.2 | 8.6 | 36 | 0.4 |
| 4G | 7.7 | 8.1 | 20 | 0.4 |
| 5G | 7.2 | 7.6 | 22 | 0.4 |
| 6G | 6.8 | 7.1 | 13 | 0.3 |
| 7G | 5.9 | 6.7 | 9 | 0.8 |

Table 5 below shows the thirteen contestants and their horses that were drawn into the 2G ability group having a range of a half of a standard deviation (0.4). Their RSI™ values fall between an 8.7 through 9.1. These thirteen contestants will only compete with each other in the barrel race.

TABLE 5

| First | Last | Horse | RSI | Draw |
|---|---|---|---|---|
| Molly | Powell | Too Fast To Judge | 9.1 | 2 |
| Jaime | Ross | A Hero Spotted | 9.1 | 2 |
| Bradee | Rutledge | Miss Non Stop Fire | 9.1 | 2 |
| Ryan | Pedone | Streakin Queenie | 9.1 | 2 |
| Joy | Cameron | This Guy Rocks | 9.1 | 2 |
| Jordan | Fowler | Like a Gidget | 8.9 | 2 |
| Steve | Smith | JeRee | 8.8 | 2 |
| Heather | Lewis | Lil Blu Diamond | 8.8 | 2 |
| Brandi | Pfeifer | ROH Docslil Rosie | 8.8 | 2 |
| Kassi | Brand-Peprah | Sixes Country Dash | 8.8 | 2 |
| Carissa | Bryant | LLP Shock and Awe | 8.7 | 2 |
| Stevie | Perkins | Frenchs Flint Colonel | 8.7 | 2 |
| Emma | Chapman | Royal Traveler | 8.7 | 2 |

Recall that the barrel racing producer decides to pay one place for every seven contestants in the ability group. Therefore, the odds of winning for every contestant will be 1:6. Table 6 below shows the payout for each of the seven ability groups according the methods and procedures described above with respect to the ability group payout.

TABLE 6

| 1G | | 2G | | 3G | | 4G | | 5G | | 6G | | 7G | |
|---|---|---|---|---|---|---|---|---|---|---|---|---|---|
| Pl. | $$$ | Pl. | $$$ | Pl. | $$$ | Pl. | $$$ | Pl. | $$$ | Pl. | $$$ | Pl. | $$$ |
| 1 | 506 | 1 | 337 | 1 | 289 | 1 | 189 | 1 | 162 | 1 | 112 | 1 | 96 |
|   |     | 2 | 168 | 2 | 240 | 2 | 126 | 2 | 121 | 2 | 55  | 2 | 47 |
|   |     |   |     | 3 | 192 | 3 | 63  | 3 | 81  |   |     |   |    |
|   |     |   |     | 4 | 144 |   |     | 4 | 40  |   |     |   |    |
|   |     |   |     | 5 | 96  |   |     |   |     |   |     |   |    |
|   |     |   |     | 6 | 48  |   |     |   |     |   |     |   |    |

Once all barrel racers have completed their barrel run, the contestants are ranked by their run times in the current event within each ability group. Table 7 below shows the 2G contestants sorted by their times. Notice that the two contestants with the fastest times received prize money according to the payouts depicted in Table 6 above.

TABLE 7

| First | Last | Horse | RSI | Draw | Time | Payout |
|---|---|---|---|---|---|---|
| Ryan | Pedone | Streakin Queenie | 9.1 | 2 | 15.069 | 337 |
| Jaime | Ross | A Hero Spotted | 9.1 | 2 | 15.154 | 168 |
| Molly | Powell | Too Fast To Judge | 9.1 | 2 | 15.333 |  |
| Bradee | Rutledge | Miss Non Stop Fire | 9.1 | 2 | 15.45 |  |
| Jordan | Fowler | Like a Gidget | 8.9 | 2 | 15.461 |  |
| Carissa | Bryant | LLP Shock and Awe | 8.7 | 2 | 15.496 |  |
| Brandi | Pfeifer | ROH Docslil Rosie | 8.8 | 2 | 15.557 |  |
| Heather | Lewis | Lil Blu Diamond | 8.8 | 2 | 15.569 |  |

TABLE 7-continued

| First | Last | Horse | RSI | Draw | Time | Payout |
|---|---|---|---|---|---|---|
| Steve | Smith | JeRee | 8.8 | 2 | 15.57 | |
| Emma | Chapman | Royal Traveler | 8.7 | 2 | 15.57 | |
| Stevie | Perkins | Frenchs Flint Colonel | 8.7 | 2 | 15.61 | |
| Kassi | Brand-Peprah | Sixes Country Dash | 8.8 | 2 | 15.65 | |
| Joy | Cameron | This Guy Rocks | 9.1 | 2 | 15.731 | |

Example 3

In this next example, 142 contestants are entered in a BRAGS™ barrel race. The average RSI™ for all entrants is 8.2 and the standard deviation is 0.8. FIG. 6 depicts ability groups 1G through 8G that are drawn using the preferred size of ability group (Group Range) one half (½) of a standard deviation. As seen in FIG. 6, ability groups are formed by beginning at the mean (8.2) and moving outward.

Table 8 below shows the starting/ending RSI™ values, number of contestants and Group Range for each ability group, 1G through 8G based on the values derived as depicted in FIG. 6. Note that the 7G and 8G ability groups have less than the preferred minimum group count, MGC=4%*142=6.

TABLE 8

| Group | Start | End | Count | Range |
|---|---|---|---|---|
| 1G | 9.0 | 9.4 | 24 | 0.4 |
| 2G | 8.5 | 8.9 | 40 | 0.4 |
| 3G | 8.0 | 8.4 | 28 | 0.4 |
| 4G | 7.5 | 7.9 | 21 | 0.4 |
| 5G | 7.0 | 7.4 | 17 | 0.4 |
| 6G | 6.5 | 6.9 | 8 | 0.4 |
| 7G | 6.0 | 6.4 | 3 | 0.4 |
| 8G | 5.5 | 5.9 | 1 | 0.4 |

Because one or more of the ability groups is smaller than the MGC (groups 7G and 8G), the group ranges must be adjusted. Table 9 below shows the adjusted group ranges and counts that will be used in the barrel race. Note that the group range for the 7G increased to meet the minimum group count of 5 while the group range for the 6G decreased in order to keep the original upper limit and group 8G has been eliminated.

TABLE 9

| Group | Start | End | Count | Range |
|---|---|---|---|---|
| 1G | 9.0 | 9.4 | 24 | 0.4 |
| 2G | 8.5 | 8.9 | 40 | 0.4 |
| 3G | 8.0 | 8.4 | 28 | 0.4 |
| 4G | 7.5 | 7.9 | 21 | 0.4 |
| 5G | 7.0 | 7.4 | 17 | 0.4 |
| 6G | 6.6 | 6.9 | 6 | 0.3 |
| 7G | 5.5 | 6.5 | 6 | 1.0 |

Table 10 below includes the contestant pairs that were drawn into the 7G ability group. These five contestant pairs are within one ability group, meaning they will only compete amongst themselves.

TABLE 10

| First | Last | Horse | RSI | Draw |
|---|---|---|---|---|
| Jenna Beth | Blair | Willy Chase Firewater | 6.5 | 7 |
| Amber | Manley | CK Chics Sargent | 6.3 | 7 |
| Penny | Mitchell | Stormy | 6.3 | 7 |
| Janice | Stephens | Nickys Private Jet | 6.1 | 7 |
| Barbrah | Harlen | Sabino Harlen | 6.1 | 7 |

Again in this example, assuming the barrel racing producer opts to pay one place for every seven contestants in the ability group, the odds of winning for every contestant will be 1:6. Table 11 below includes the payout for each of the seven ability groups according the methods and procedures described in the ability group payout section above.

TABLE 11

| 1G | | 2G | | 3G | | 4G | | 5G | | 6G | | 7G | |
|---|---|---|---|---|---|---|---|---|---|---|---|---|---|
| Pl. | $$$ | Pl. | $$$ | Pl. | $$$ | Pl. | $$$ | Pl. | $$$ | Pl. | $$$ | Pl. | $$$ |
| 1 | 596 | 1 | 319 | 1 | 198 | 1 | 139 | 1 | 111 | 1 | 62 | 1 | 53 |
| 2 | 447 | 2 | 266 | 2 | 149 | 2 | 92 | 2 | 74 | | | | |
| 3 | 298 | 3 | 213 | 3 | 99 | 3 | 46 | 3 | 37 | | | | |
| 4 | 149 | 4 | 159 | 4 | 49 | | | | | | | | |
| | | 5 | 106 | | | | | | | | | | |
| | | 6 | 53 | | | | | | | | | | |

Once all barrel racers have completed their barrel run, the contestants are ranked by their run times within each ability group. Table 12 below shows the 7G contestants sorted by their respective times. Note that the only the top contestant with the fastest time received prize money according to the payout chart of Table 11 above.

TABLE 12

| First | Last | Horse | RSI | Draw | Time | Payout |
|---|---|---|---|---|---|---|
| Jenna Beth | Blair | Willy Chase Firewater | 6.5 | 7 | 17.025 | 53 |
| Penny | Mitchell | Stormy | 6.3 | 7 | 17.688 | |

TABLE 12-continued

| First | Last | Horse | RSI | Draw | Time | Payout |
|---|---|---|---|---|---|---|
| Janice | Stephens | Nickys Private Jet | 6.1 | 7 | 17.748 | |
| Barbrah | Harlen | Sabino Harlen | 6.1 | 7 | 17.892 | |
| Amber | Manley | CK Chics Sargent | 6.3 | 7 | 18.46 | |

The above described determinations, calculations and groupings in the various embodiments are performed through application programs stored locally on a standalone or networked computer system. Some users may rely upon standalone computer systems without wide area network access, including no Internet access, meaning the user can be provided with historic race data and provided with periodically updated race results over time. Past race results can be stored in one or more local or remote databases accessible by users of the presently described ability grouping systems and method through a local or wide area network such as the Internet. Application programs to perform the ability groupings and necessary operations may be provided to users as downloadable software or may be accessible on a periodic subscription basis, as known in the art. A programmer having ordinary skill in the programming art can develop application programs available to the user in a variety of forms and over a variety of networks as described.

The systems and methods described above can be used for other kinds of speed events, e.g. for pole bending events.

Similar systems and methods such as those described above can be used at judged equine events, including Cutting, Reining Cow Horse, and Reining. For these events, the preferred PPI will be the average of judging scores from prior events but may include other data, also allowing classes to be subdivided based on the ability of horse/rider combination.

As used herein, the term "about" means that the amount or condition it modifies can vary some beyond that stated so long as the advantages of the invention are realized and the concept of the invention is maintained.

Different embodiments employing the concept and teachings of the invention will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

While the disclosed embodiments have been described with reference to one or more particular implementations, these implementations are not intended to limit or restrict the scope or applicability of the invention. Those having ordinary skill in the art will recognize that many modifications and alterations to the disclosed embodiments are available. Therefore, each of the foregoing embodiments and obvious variants thereof is contemplated as falling within the spirit and scope of the disclosed inventions.

While the invention has been particularly shown and described with reference to a preferred embodiment, it will be understood by those skilled in the art that various changes in form and detail can be made therein without departing from the spirit and scope of the invention.

I claim:

1. A method of assigning a value to a horse according to an ability level grouping including each of a plurality of contestants in events in which the horse has participated, comprising the steps of:
retrieving performance result data for a plurality of previous-competitive events for each of the plurality of contestants;
generating, by a processor, a scaled event rate for each of the plurality of contestants based on a standardized event venue parameter, an actual event venue parameter, and the retrieved performance result data;
indexing the scaled event rates based on a predefined fraction of an average of a total number of scaled event rates;
creating, by a processor prior to the event, a plurality of ability level groups of contestants according to an average of the indexed values, comprising:
a first ability level group defined by a first ability index value and a second ability index value, and
a second ability level group defined by a third ability index value and a fourth ability index value,
wherein at the first ability level group and the second ability level group comprise at least a predetermined number of contestants;
allocating a prize purse for each of the plurality of ability level groups according to the number of ability level groups created and a rank of each of the plurality of ability level groups created; and
allocating a value to the horse according to an amount of the prize purse attributable to the horse.

2. The method of claim 1, wherein the event is an equine barrel race.

3. The method of claim 1, wherein the event is an equine pole bending race.

4. The method of claim 1, wherein the event is a judged event.

5. The method of claim 1, wherein the event is a timed event.

6. A method of assigning an ability level to a plurality of contestant horses prior to an event, comprising the steps of:
retrieving performance result data for a plurality of previous-timed race events for each of the plurality of contestant horses;
generating, by a processor, an event rate factor for each of the plurality of contestant horses based on a standardized race path parameter, an actual race path parameter and the retrieved performance result data;
creating an index of scaled event rate factors based on a fraction of an average of a predefined number of scaled event rates for each of the plurality of contestant horses;
allocating a prize purse for the plurality of contestant horses according to the index of scaled event rate factors; and
assigning to the plurality of contestant horses within an ability group level a portion of the prize purse according to the index of scaled event rate factors.

7. The method of claim 6, wherein the scaled event rate factor is determined on a 10 point scale.

8. The method of claim 6, wherein the scaled event rate factor is determined on a 100 point scale.

9. The method of claim 6, further comprising excluding the retrieved performance result data of a horse corresponding to a particular event from the scaled event rate factor based on the age of the retrieved performance data of the horse.

10. The method of claim 6, further comprising excluding the retrieved performance result data of a horse from the scaled value factor based on the number of retrieved performance data results of the horse.

11. The method of claim 6, wherein the event is an equine barrel race.

12. The method of claim 6, wherein the event is an equine pole bending race.

13. The method of claim 6, wherein the event is a judged event.

14. The method of claim 6, wherein the event is a timed event.

15. The method of claim 1, wherein the first ability index value is greater than the average of the indexed values and the second ability index value is less than the average of the indexed values.

16. The method of claim 15, wherein the third ability index value is greater than the fourth ability index value and the first ability index value is greater than the fourth ability index value.

17. The method of claim 16, wherein the step of creating a plurality of ability level groups further comprises: a third ability level group defined by a fifth ability index value and a sixth ability index value,
wherein the third ability level group comprises at least a predetermined number of contestant horses.

18. The method of claim 17, wherein the fourth ability index value is less than the third ability index value and the fifth ability index value is greater than the sixth ability index value.

19. The method of claim 1, wherein the step of creating a plurality of ability level groups further comprises: increasing the second ability index value and decreasing the third ability index value when the number of contestants in the second ability level group is less than the predetermined number of contestants.

20. The method of claim 17, wherein the step of creating a plurality of ability level groups further comprises:
decreasing the sixth ability index value and decreasing the first ability index value when the number of contestants in the third ability group is less than the predetermined number of contestants.

21. The method of claim 1, further comprising the step of assigning to the contestant horses within an ability level group a portion of the prize purse according to a predefined number of prize recipients.

* * * * *